July 5, 1927.

F. O. FARWELL 1,634,657

ROAD LIGHT LAMP

Filed Jan. 20, 1926

2 Sheets-Sheet 1

Inventor
Fay O. Farwell
By Ernest F. Crampton
Attorney

July 5, 1927.

F. O. FARWELL

ROAD LIGHT LAMP

Filed Jan. 20, 1926

1,634,657

2 Sheets-Sheet 2

Inventor
Fay O. Farwell

Attorney

Patented July 5, 1927.

1,634,657

UNITED STATES PATENT OFFICE.

FAY O. FARWELL, OF TOLEDO, OHIO.

ROAD LIGHT LAMP.

Application filed January 20, 1926. Serial No. 82,422.

My invention has for its object to provide an adjustable road light lamp for automobiles which is so designed that it may be located forward of the radiator of an automobile and remotely controlled or manipulated as by the driver of the automobile. Preferably, it is controlled by means located on the steering post of the automobile. The invention particularly provides a simple and efficient means for adjusting the focal axis of the lamp relative to the automobile, adjusting the focus of the lamp along the axis and adjusting the bulb or its filament relative to the focal axis of the reflector of the lamp.

The invention may be contained in adjustable road light brackets of different forms and to illustrate a practical application of the invention I have selected an adjustable road light lamp as an example of structures that embody the invention and shall describe it hereinafter. The lamp selected is shown in the accompanying drawings.

Figure 1:
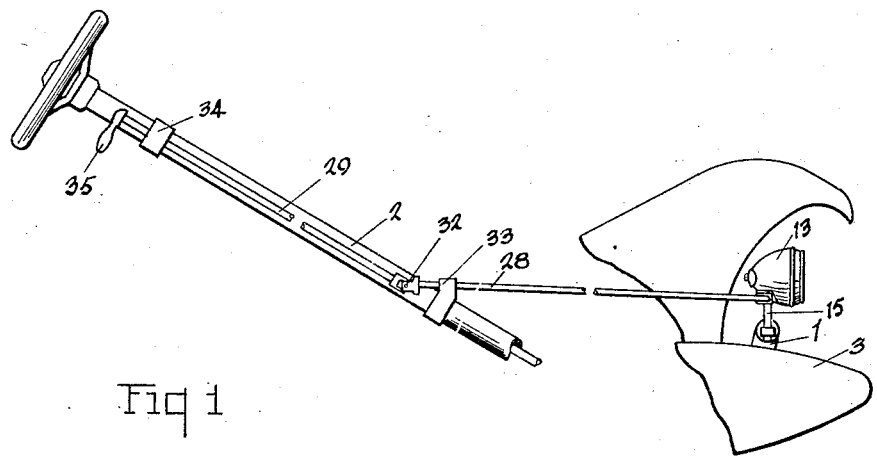
Figure 2:
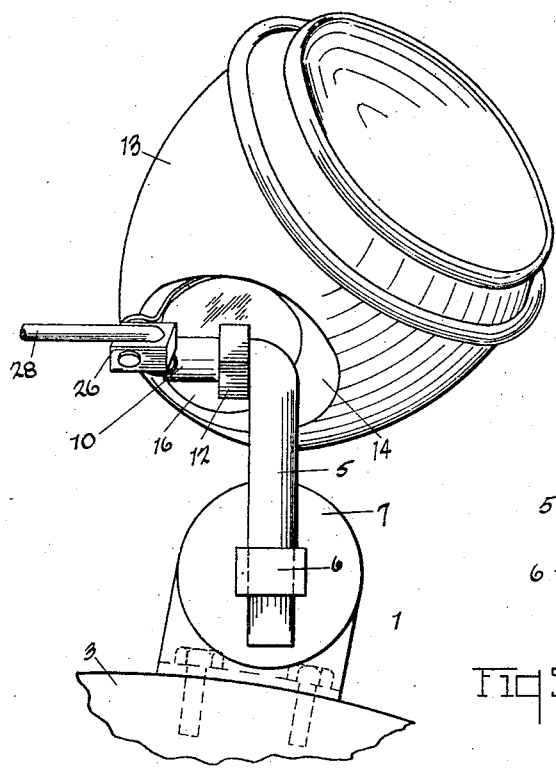
Figure 3:
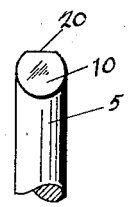
Figure 4:
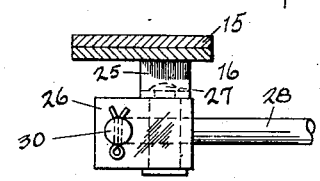
Figure 5:
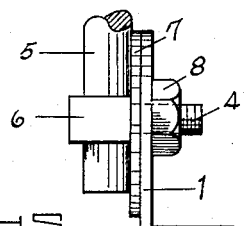
Figure 6:
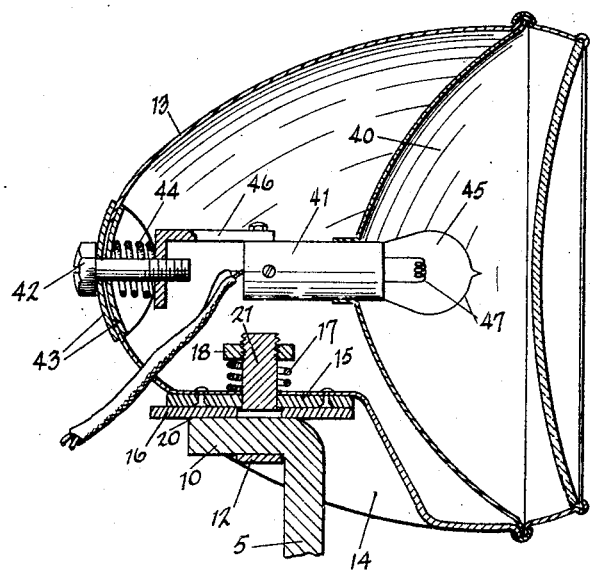
Figure 7:
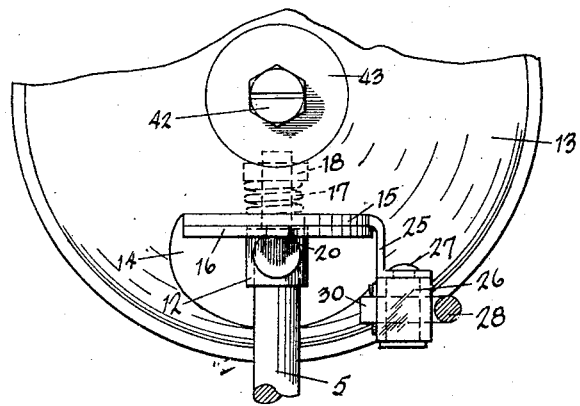

Figure 1 of the drawings illustrates a lamp that is supported on a part of the chassis frame and is controlled by a handle that is located on the steering post of the automobile. Fig. 2 is a perspective view of the lamp when its focal axis extends diagonally upward and towards one side of the automobile. Fig. 3 is a view of a member on which the lamp is pivotally supported. Fig. 4 illustrates a pivoted block that interconnects the remote controlling means with the lamp to manipulate the lamp. Fig. 5 is the edge view of the bracket. Fig. 6 illustrates a view of a section taken on a plane extending through the focal axis of the lamp. Fig. 7 illustrates a rear view of the lamp.

The lamp shown in the drawings is supported on a suitable bracket such as the bracket 1, located preferably, just ahead of the radiator and substantially in line with the steering post 2 of the automobile. It may be supported on the forward end of the chassis frame 3. The bracket 1 is provided with a bolt 4 having an eye in which is located a right angular upright post 5. The end 6 of the bolt is so constructed and its eye is so located that the post 5 may be adjustably secured in position. It may be adjusted longitudinally within the eye or it may be adjusted angularly. Preferably a washer 7 surrounds the inner edge portion of the end 6 of the bolt 4 whereby the post 5 may be clamped against the washer 7 and the washer 7 and the post 5 may be adjusted angularly and secured in their adjusted positions by means of the nut 8 that is threaded on to the bolts 6.

The right angular post 5 is preferably located in a vertical position so that the axis of the portion or supporting member 10 of the post 5 will be located in a horizontal plane. The lamp is pivotally supported on the end portion of the post 5 by means of the member 11 which is connected to the lamp. The member 11 is a bolt having a rectangular head 12 that is supported on the upper end of the post 5 and is pivotally connected to the portion 10 that forms a supporting member for the lamp. The lamp has a shell 13 that is indented or depressed to form the recess 14 on the lower side of the lamp. A bearing plate 15 is preferably secured as by rivets to the bottom of the depression and the bolt extends through the plate 15 into the shell. A washer 16 may be located intermediate the plane 15 and the supporting member 10. A spring 17 is located on the bolt and between a nut 18 and the shell wall or the plate 15, and so as to elastically press the lamp along the bolt, that is, to draw the bolt into the shell and press the washer 16 against the surface of the member 10. The major portion of the surface of the member 10 is preferably cylindrical while its top portion is preferably flattened so as to form substantially a plane surface on top of the support 5. The opening through the head 12 of the bolt is cylindrical and consequently when the member 10 is rotated about the axis of the member 10 a noticeable release movement will be automatically performed by the action of the spring 17 as the washer 16 is brought over the edge of the plane or flattened surface 20 of the member 10, the flattened surface being located on the upper side of the member 10 will be in a horizontal plane when the post 5 is located in a vertical position and consequently, a bolt 21 will be yieldingly held in a vertical position when the lamp has been turned to such a position as to bring the washer 16 into contact with the plane surface 20 on the upper side of the member 10. However, the lamp may be rotated about the axis of the member 10 to adjust the focal axis and to project the light in any desired direction. The lamp is rotatably supported on the bolt 21, and also the lamp may be rotated about the axis of the bolt 21 and therefore the focal axis of the lamp may be pointed in any desired direction. When adjusting the lamp while driving along the road it is preferable to return the lamp to the position such that the washer 16 will be in contact with the flattened or plane surface 20 since while in this position the lamp may be turned about the vertical axis and the line of projection will be always located in a plane which will prevent the light from rising to the eyes of a driver of an approaching car. This position of the lamp can be readily determined by reason of the flattened surface 20 against which the washer 16 is pressed by the spring 17.

To adjust the angular position of the focal axis of the lamp relative to the automobile by one located remotely from the lamp as by the driver of the automobile, the plate 15 is provided with a finger 25 and a block 26 is pivotally connected to the end of the finger by means of the rivet 27. A pair of jointed links 28 and 29 are connected to the block 26. The end of the link 28 has a right angular end portion 30 that extends through the block 26 in a direction at right angles to the axis of the rivet 27 about which the block 26 rotates and consequently when the link 28 is rotated it will rotate the lamp about the axis of the supporting member 10 but when the link 28 is moved longitudinally either forward or back it will rotate the lamp about the axis of the member 21. Preferably, the link 28 is located in substantially a horizontal plane since the member 10 is located in a horizontal plane and consequently the right angular portion 30 of the link 28 will raise or lower the block 26 about the axis of the member 10. Also the jointed end of the link 28 is preferably located substantially in line with the axis of the member 10. This will reduce the resistance to the rotation about the member 10. The links 28 and 29 may be connected together by means of a universal joint 32 and the angle between the links 28 and 29 are such that the link 28 may be moved longitudinally, when the link 29 is moved longitudinally. The link 28 is supported in a bracket 33 that is located on the post 2 while the link 29 may be supported in the bracket 34 which is preferably located near the upper end of the post 2. A handle 35 is connected to the upper end of the link 29 for conveniently moving the links both rotatably and longitudinally to adjustably locate the focal axis of the lamp relative to the automobile.

In order to adjust the focus of the lamp and to place the bulb, or, preferably, the center of the filament of the lamp in the focal axis of the reflector 40, the bulb socket 41 is connected to a bolt 42. The bolt 42 extends through the rear end portion of the shell and a pair of washers 43 that conforms substantially to the exterior and interior surfaces of the rear end of the shell 13. The opening in the shell 13 in which the bolt 42 is located is materially larger than the bolt and so that the bolt may be shifted laterally with respect to the axis of the shell. A compression spring 44, is located intermediate the washers and the socket 41 so as to press the washers towards each other and thus clamp the edge portion of the shell 13 about the opening through which the bolt 42 extends. By rotation of the bolt 42, the clamping action of the washers 43 will not only be varied but also the axis of the lamp, and also the bolt 42 may be shifted within the opening in the rear end of the shell 13 so as to locate substantially the center of the filament 47 in the focal axis of the reflector 40. Preferably the bolt 42 is threaded into a bracket 46 that is secured to the socket 41. By this means the light may be focused to a definite point which may be adjusted or varied as may be desired and diffusion of the lamp may be quite entirely eliminated, which is otherwise caused by the center of the light being located at one side of the focal axis of the reflector. It is impossible to obtain uniform construction in arrangement of lamps and reflectors and it is impossible to center or mount reflectors always in exactly the same position relative to the bulbs of the lamps and consequently there is a considerable diffusion of the light produced by such lamps which is eliminated by the means provided by my invention for readily and accurately adjusting the center of the source of light not only along the axis but with respect to the axis and so as to locate it in the focal axis of the lamp.

Thus by my invention I have provided a means for adjusting the focal axis of the lamp relative to the automobile and the focus of the lamp and bulb or source of light relative to the focal axis of the lamp.

What I claim is:

1. In a device of the kind described, a bracket including a journal portion, a bolt forming a stub shaft and rotatably mounted on said journal portion to extend at right angles thereto, a lamp rotatably mounted on said bolt, and a single operating means connected to said lamp and movable longitudinally to swing the lamp about said bolt and rotatively to swing the bolt about the journal portion.

2. In a device of the kind described, a bracket including a journal portion, a bolt forming a stub shaft and rotatably mounted on said journal portion to extend at right angles thereto, a lamp rotatably mounted on said bolt, a single operating means connected to said lamp and movable longitudinally to swing the lamp about said bolt and rotatively to swing the bolt about the journal portion, said journal portion having a flat portion on one side against which the lamp engages in normal position, and spring means normally urging the lamp against the flat portion.

3. In a device of the kind described, a bracket including a journal portion flattened on one side, a bolt having a cylindrical opening in one end fitting on said journal portion to revolve thereabout, a lamp having a flat disk like portion journalled on said bolt and normally resting on the flattened side thereof, a spring surrounding said bolt and urging the disk like portion against the flattened side of the journal, and a single operating means connected to said lamp and movable longitudinally to swing the lamp about said bolt and rotatively to swing the bolt about the journal portion.

In testimony whereof I have hereunto signed my name to this specification.

FAY O. FARWELL.